(12) United States Patent
Lippert

(10) Patent No.: US 9,157,512 B2
(45) Date of Patent: Oct. 13, 2015

(54) MULTI-SPEED TRANSMISSION

(71) Applicant: FORD GLOBAL TECHNOLOGIES, LLC, Dearborn, MI (US)

(72) Inventor: Robert Scott Lippert, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 7 days.

(21) Appl. No.: 14/042,811

(22) Filed: Oct. 1, 2013

(65) Prior Publication Data

US 2015/0094184 A1    Apr. 2, 2015

(51) Int. Cl.
*F16H 3/64* (2006.01)
*F16H 3/62* (2006.01)

(52) U.S. Cl.
CPC .......... *F16H 3/62* (2013.01); *F16H 2200/0065* (2013.01); *F16H 2200/201* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

| | | | |
|---|---|---|---|
| 7,727,102 B2 | 6/2010 | Phillips et al. | |
| 7,749,126 B2 | 7/2010 | Hart et al. | |
| 7,927,248 B2 | 4/2011 | Hart et al. | |
| 7,976,425 B2 | 7/2011 | Wittkopp et al. | |
| 7,985,158 B2 * | 7/2011 | Phillips et al. | 475/276 |
| 7,993,236 B2 | 8/2011 | Hart et al. | |
| 8,016,708 B2 * | 9/2011 | Diosi et al. | 475/276 |
| 8,033,947 B2 * | 10/2011 | Phillips et al. | 475/275 |
| 8,047,945 B2 | 11/2011 | Wittkopp et al. | |
| 8,047,954 B2 | 11/2011 | Phillips et al. | |

OTHER PUBLICATIONS

Benford, Howard L., et al., "The Lever Analogy: A New Tool in Transmission Analysis", Technical Paper No. 810102, Feb. 1, 1981, pp. 429-437, Copyright 1982 Society of Automotive Engineers, Inc.

* cited by examiner

*Primary Examiner* — Ramya Burgess
*Assistant Examiner* — Mark Manley
(74) *Attorney, Agent, or Firm* — James Dottavio; Brooks Kushman P.C.

(57) ABSTRACT

A transmission gearing arrangement produces nine forward speed ratios and one reverse speed ratio by selective engagement of three shift elements in various combinations. Some embodiments includes four simple planetary gear sets and six shift elements of which two may be brakes. Other alternative embodiments may additionally include a third brake.

21 Claims, 3 Drawing Sheets

MULTI-SPEED TRANSMISSION

TECHNICAL FIELD

This disclosure relates to the field of automatic transmissions for motor vehicles. More particularly, the disclosure pertains to an arrangement of gears, clutches, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

SUMMARY OF THE DISCLOSURE

In a first embodiment, a transmission includes first, second, and third gearing arrangements. The first gearing arrangement fixedly imposes a linear speed relationship between a first shaft, a second shaft, a third shaft, and a fourth shaft. The first gearing arrangement may be, for example, a Simpson planetary gear set. Alternatively, the first gearing arrangement may be, for example, a double pinion planetary gear set and a simple planetary gear set. The first gearing arrangement may also be other combinations of two simple planetary gear sets. The second gearing arrangement selectively constrains the fourth shaft to rotate faster than an input shaft and in the same direction. The second gearing arrangement may be, for example, a simple planetary gear set in combination with a clutch or brake. The third gearing arrangement selectively imposes a linear speed relationship between the input shaft, an output shaft, and the second shaft. The third gearing arrangement may be, for example, a simple planetary gear set in combination with a clutch. The transmission may further comprise an additional brake or clutch.

In a second embodiment, a transmission includes an input shaft, an output shaft, first, second, third, and fourth shafts, first, second, and third gearing arrangements, first and second brakes, and first and second clutches. The first gearing arrangement fixedly imposes a linear speed relationship between a first shaft, a second shaft, a third shaft, and a fourth shaft. The first gearing arrangement may be, for example, a Simpson planetary gear set. Alternatively, the first gearing arrangement may be, for example, a double pinion planetary gear set and a simple planetary gear set. The first gearing arrangement may also be other combinations of two simple planetary gear sets. The second gearing arrangement selectively constrains the fourth shaft to rotate faster than an input shaft and in the same direction. The second gearing arrangement may be, for example, a simple planetary gear set in combination with a clutch or brake. The third gearing arrangement selectively imposes a linear speed relationship between the input shaft, an output shaft, and the second shaft. The third gearing arrangement may be, for example, a simple planetary gear set in combination with a clutch.

DETAILED DESCRIPTION

Figure 1:
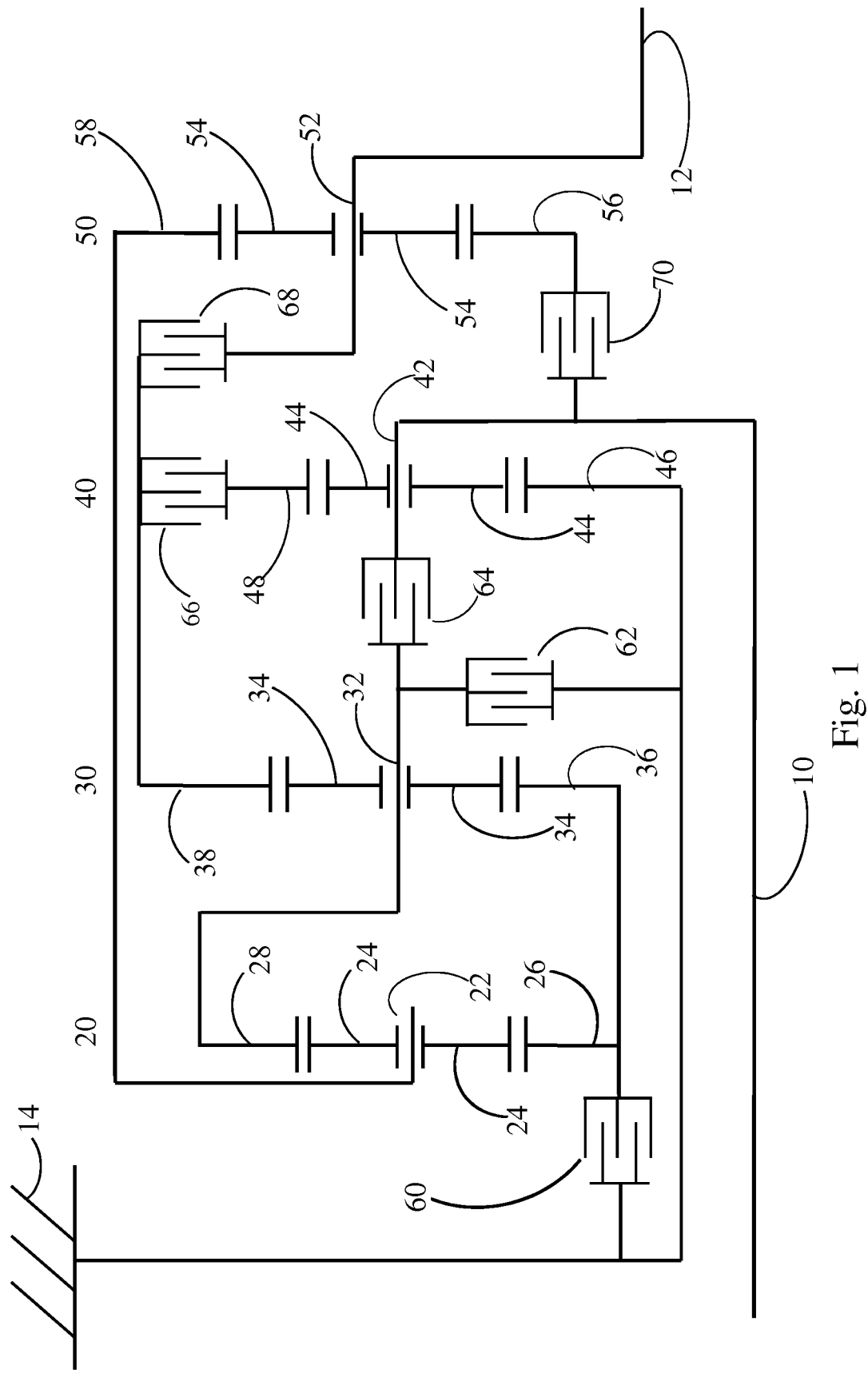
FIG. 1 is a schematic diagram of a first transmission gearing arrangement.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A gearing arrangement is a collection of rotating elements and shift elements configured to impose specified speed relationships among the rotating elements. Some speed relationships, called fixed speed relationships, are imposed regardless of the state of any shift elements. Other speed relationships, called selective speed relationships, are imposed only when particular shift elements are fully engaged. A linear speed relationship exists among an ordered list of rotating elements when i) the first and last rotating element in the group are constrained to have the most extreme speeds, ii) the speeds of the remaining rotating elements are each constrained to be a weighted average of the first and last rotating element, and iii) when the speeds of the rotating elements differ, they are constrained to be in the listed order, either increasing or decreasing. The speed of an element is positive when the element rotates in one direction and negative when the element rotates in the opposite direction. A discrete ratio transmission has a gearing arrangement that selectively imposes a variety of speed ratios between an input shaft and an output shaft.

A group of rotating elements are fixedly coupled to one another if they are constrained to rotate as a unit in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. One or more rotating elements that are all fixedly coupled to one another may be called a shaft. In contrast, two rotating elements are selectively coupled by a shift element when the shift element constrains them to rotate as a unit whenever it is fully engaged and they are free to rotate at distinct speeds in at least some other operating condition. A shift element that holds a rotating element against rotation by selectively connecting it to the housing is called a brake. A shift element that selectively couples two or more rotating elements to one another is called a clutch. Shift elements may be actively controlled devices such as hydraulically or electrically actuated clutches or brakes or may be passive devices such as one way clutches or brakes. Two rotating elements are coupled if they are either fixedly coupled or selectively coupled.

An example transmission is schematically illustrated in FIG. 1. The transmission utilizes four simple planetary gear sets 20, 30, 40, and 50. A planet carrier 22 rotates about a central axis and supports a set of planet gears 24 such that the planet gears rotate with respect to the planet carrier. External gear teeth on the planet gears mesh with external gear teeth on a sun gear 26 and with internal gear teeth on a ring gear 28. The sun gear and ring gear are supported to rotate about the same axis as the carrier. Gear sets 30, 40, and 50 are similarly structured.

A simple planetary gear set is a type of gearing arrangement that imposes a fixed linear speed relationship among the sun gear, the planet carrier, and the ring gear. Other known types of gearing arrangements also impose a fixed linear speed relationship among three rotating elements. For example, a double pinion planetary gear set imposes a fixed linear speed relationship among the sun gear, the ring gear, and the planet carrier.

A suggested ratio of gear teeth for each planetary gear set is listed in Table 1.

TABLE 1

| Ring 28/Sun 26 | 1.595 |
| Ring 38/Sun 36 | 1.750 |
| Ring 48/Sun 46 | 3.733 |
| Ring 58/Sun 56 | 2.230 |

In the transmission of FIG. 1, input shaft 10 is fixedly coupled to carrier 42. Output shaft 12 is fixedly coupled to carrier 52. Sun gear 26 is fixedly coupled to sun gear 36 and selectively held against rotation by brake 60. Carrier 22 is fixedly coupled to ring gear 58. Ring gear 28 is fixedly coupled to carrier 32, selectively held against rotation by brake 62, and selectively coupled to input shaft 10 by clutch 64. Ring gear 38 is selectively coupled to ring gear 48 by clutch 66 and selectively coupled to output shaft 12 by clutch 68. Sun gear 46 is fixedly held against rotation. Sun gear 56 is selectively coupled to input shaft 10 by clutch 70.

Various combinations of gear sets, clutches, and brakes selectively impose particular speed relationships. The combination of gear set 20 and gear set 30 fixedly imposes a linear speed relationship between sun gear 26, carrier 22, ring gear 28, and ring gear 38. The combination of gear set 40 and clutch 66 selectively imposes an overdrive relationship between input shaft 10 and ring gear 38. In other words, engaging clutch 66 constrains ring gear 38 to rotate faster than input shaft 10 and in the same direction. The combination of gear set 50 and clutch 70 selectively imposes a linear speed relationship among input shaft 10, output shaft 12, and carrier 22. Engaging clutch 70 couples sun gear 56 to input shaft 10 and imposes a linear speed relationship between input shaft 10, output shaft 12, and carrier 22.

As shown in Table 2, engaging the shift elements in combinations of three establishes nine forward speed ratios and one reverse speed ratio between input shaft 10 and output shaft 12. An X indicates that the shift element is required to establish the speed ratio. When the gear sets have tooth number ratios as indicated in Table 1, the speed ratios have the values indicated in Table 2.

TABLE 2

| | 60 | 62 | 64 | 66 | 68 | 70 | Ratio | Step |
|---|---|---|---|---|---|---|---|---|
| Rev. | | X | | X | | X | −3.65 | 77% |
| 1st | | X | | | X | X | 4.77 | |
| 2nd | X | X | | | | X | 3.27 | 1.46 |
| 3rd | X | | | | X | X | 2.37 | 1.38 |
| 4th | X | | | X | | X | 1.53 | 1.55 |
| 5th | X | | X | | | X | 1.35 | 1.13 |
| 6th | | | X | X | | X | 1.14 | 1.19 |
| 7th | | | X | | X | X | 1.00 | 1.14 |
| 8th | | | X | X | X | | 0.79 | 1.27 |
| 9th | X | | X | | X | | 0.64 | 1.24 |

When the driver selects drive (forward), the transmission is prepared for vehicle launch in 1st by engaging brake 62 and clutches 68 and 70. A shift to 2nd may be accomplished by gradually disengaging clutch 68 while gradually engaging brake 60. Additional upshifts are accomplished according to Table 2. When the driver selects reverse, the transmission is prepared for vehicle launch in reverse by engaging brake 62 and clutches 66 and 70.

Figure 2:
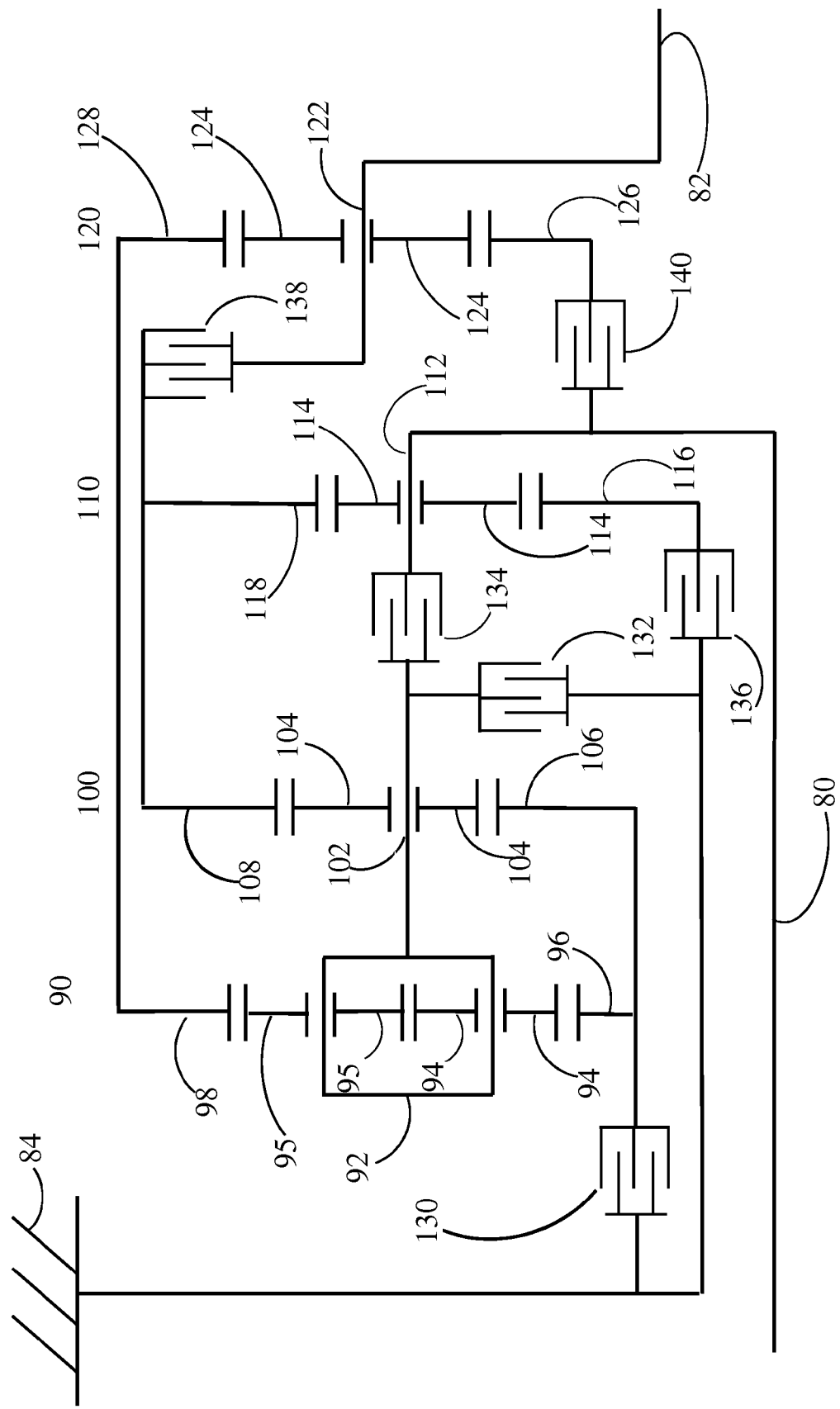
FIG. 2 is a schematic diagram of a second transmission gearing arrangement.

A second example transmission is illustrated in FIG. 2. This transmission utilizes four planetary gear sets with suggested tooth number ratios as shown in Table 3.

TABLE 3

| Ring 28/Sun 26 | 2.655 |
| Ring 38/Sun 36 | 1.750 |
| Ring 48/Sun 46 | 3.743 |
| Ring 58/Sun 56 | 2.270 |

In this transmission, gear set 90 is a double pinion planetary gear set, which is another type of fixed gearing arrangement. A planet carrier 92 rotates about a central axis and supports an inner set of planet gears 94 and an outer set of planet gears 95. External gear teeth on each of the inner planet gears 94 mesh with external gear teeth on a sun gear 96 and with internal gear teeth on one of the outer planet gears 95. External gear teeth on each of the outer planet gears 95 mesh with internal gear teeth on a ring gear 98. The sun gear and ring gear are supported to rotate about the same axis as the carrier. A double pinion planetary gear set imposes the fixed speed relationship that the speed of the ring gear is between the speed of the sun gear and the speed of the carrier. (This relationship is defined to include the condition in which all three rotate at the same speed.) More specifically, the speed of the ring gear is a weighted average of the speed of the sun gear and the speed of the carrier with weighting factors determined by the number of teeth on each gear.

In this transmission, input shaft 80 is fixedly coupled to carrier 112. Output shaft 82 is fixedly coupled to carrier 122. Ring gear 98 is fixedly coupled to ring gear 128. Carrier 92 is fixedly coupled to carrier 102, selectively held against rotation by brake 132, and selectively coupled to input shaft 80 by clutch 134. Sun gear 96 is fixedly coupled to sun gear 106 and selectively held against rotation by clutch 130. Ring gear 108 is fixedly coupled to ring gear 118 and selectively coupled to output shaft 82 by clutch 138. Sun gear 116 is selectively held against rotation by brake 136. Sun gear 126 is selectively coupled to input shaft 80 by clutch 140. The transmission of FIG. 2 is operated in the same fashion as the transmission of FIG. 1.

Various combinations of gear sets, clutches, and brakes selectively impose particular speed relationships. The combination of gear set 90 and gear set 100 fixedly imposes a linear speed relationship between sun gear 96, ring gear 98, carrier 92, and ring gear 108. The combination of gear set 110 and brake 136 selectively imposes an overdrive relationship between input shaft 80 and ring gear 98. In other words, engaging clutch 136 constrains ring gear 108 to rotate faster than input shaft 80 and in the same direction. The combination of gear set 120 and clutch 140 selectively imposes a linear speed relationship between input shaft 80, output shaft 82, and ring gear 98. Engaging clutch 140 couples sun gear 126 to input shaft 80 and imposes a linear speed relationship between input shaft 80, output shaft 82, and ring gear 98.

Figure 3:
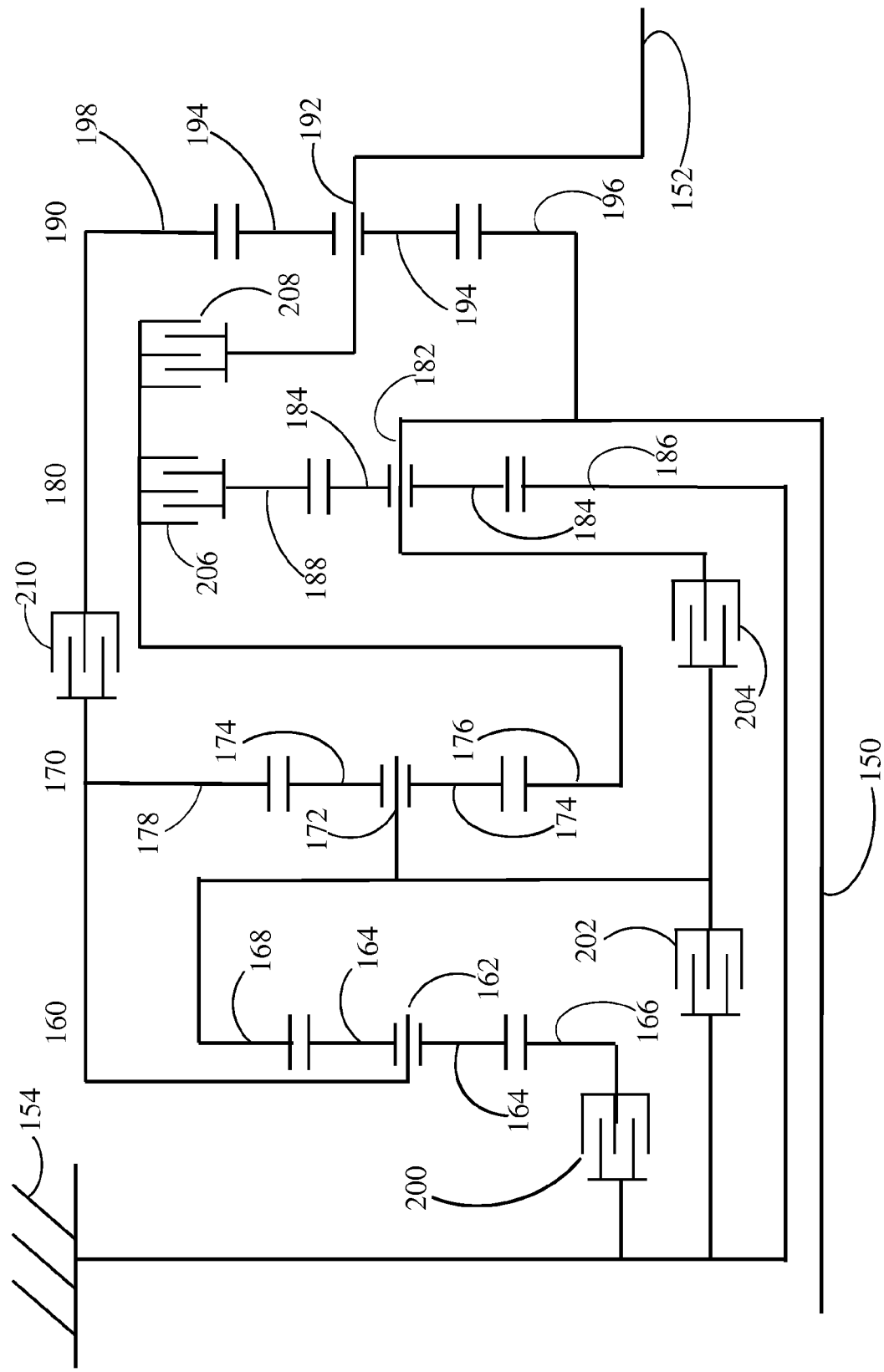
FIG. 3 is a schematic diagram of a third transmission gearing arrangement.

A third example transmission is illustrated in FIG. 3. This transmission utilizes four simple planetary gear sets with suggested tooth number ratios as shown in Table 4.

TABLE 4

| Ring 28/Sun 26 | 1.655 |
|---|---|
| Ring 38/Sun 36 | 1.517 |
| Ring 48/Sun 46 | 3.743 |
| Ring 58/Sun 56 | 2.270 |

In this transmission, input shaft 150 is fixedly coupled to carrier 182 and to sun gear 196. Output shaft 152 is fixedly coupled to carrier 192. Sun gear 166 is selectively held against rotation by brake 200. Carrier 162 is fixedly coupled to ring gear 178 and selectively coupled to ring gear 198 by clutch 210. Ring gear 168 is fixedly coupled to carrier 172, selectively held against rotation by brake 202, and selectively coupled to input shaft 150 by clutch 204. Sun gear 176 is selectively coupled to ring gear 188 by clutch 206 and selectively coupled to output shaft 162 by clutch 208. Sun gear 186 is fixedly held against rotation. The transmission of FIG. 3 is operated in the same fashion as the transmissions of FIGS. 1 and 2.

Various combinations of gear sets, clutches, and brakes selectively impose particular speed relationships. The combination of gear set 160 and gear set 170 fixedly imposes a linear speed relationship between sun gear 166, carrier 162, ring gear 168, and sun gear 176. The combination of gear set 180 and clutch 206 selectively imposes an overdrive relationship between input shaft 150 and sun gear 176. In other words, engaging clutch 206 constrains sun gear 176 to rotate faster than input shaft 150 and in the same direction. The combination of gear set 190 and clutch 210 selectively imposes a linear speed relationship between input shaft 150, output shaft 152, and carrier 162. Engaging clutch 210 couples carrier 162 to ring gear 198 and imposes a linear speed relationship between input shaft 150, output shaft 152, and carrier 162.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission comprising:
   a first gearing arrangement which fixedly imposes a linear speed relationship in order of first, second, third, and fourth shafts;
   a brake which selectively brakes the first shaft;
   a second gearing arrangement which selectively constrains the fourth shaft to rotate faster than an input and in a same direction; and
   a third gearing arrangement which selectively imposes a linear speed relationship in order of the input, an output, and the second shaft.

2. The transmission of claim 1, wherein the first gearing arrangement comprises:
   a first simple planetary gear set having a first sun gear fixedly coupled to the first shaft, a first ring gear fixedly coupled to the third shaft, a first planet carrier fixedly coupled to the second shaft, and at least a first planet gear supported for rotation on the first planet carrier and in continuous meshing engagement with the first sun gear and the first ring gear; and
   a second simple planetary gear set having a second sun gear fixedly coupled to the first shaft, a second ring gear fixedly coupled to the fourth shaft, a second planet carrier fixedly coupled to the third shaft, and at least a second planet gear supported for rotation on the second planet carrier and in continuous meshing engagement with the second sun gear and the second ring gear.

3. The transmission of claim 1, wherein the first gearing arrangement comprises:
   a double pinion planetary gear set having a first sun gear fixedly coupled to the first shaft a first ring gear fixedly coupled to the second shaft, a first planet carrier fixedly coupled to the third shaft, at least a first inner planet gear supported for rotation relative to the first planet carrier and in continuous meshing engagement with the first sun gear, and at least a first outer planet gear supported for rotation relative to the first planet carrier and in continuous meshing engagement with the first inner planet gear and the first ring gear; and
   a simple planetary gear set having a second sun gear fixedly coupled to the first shaft, a second ring gear fixedly coupled to the fourth shaft, a second planet carrier fixedly coupled to the third shaft, and at least a first planet gear supported for rotation on the second planet carrier and in continuous meshing engagement with the second sun gear and the second ring gear.

4. The transmission of claim 1, wherein the first gearing arrangement comprises:
   a first simple planetary gear set having a first sun gear fixedly coupled to the first shaft, a first ring gear fixedly coupled to the third shaft, a first planet carrier fixedly coupled to the second shaft, and at least a first planet gear supported for rotation on the first planet carrier and in continuous meshing engagement with the first sun gear and the first ring gear; and
   a second simple planetary gear set having a second sun gear fixedly coupled to the fourth shaft, a second ring gear fixedly coupled to the second shaft, a second planet carrier fixedly coupled to the third shaft, and at least a second planet gear supported for rotation on the second planet carrier and in continuous meshing engagement with the second sun gear and the second ring gear.

5. The transmission of claim 1, wherein the second gearing arrangement comprises a simple planetary gear set having a sun gear, a ring gear fixedly coupled to the fourth shaft, a planet carrier fixedly connected to the input, and at least one planet gear supported on the planet carrier and in continuous meshing engagement with the sun gear and the ring gear, and a brake configured to selectively hold the sun gear against rotation.

6. The transmission of claim 1, wherein the third gearing arrangement comprises a simple planetary gear set having a sun gear, a ring gear fixedly connected to the second shaft, a planet carrier fixedly connected to the output, and at least one planet gear supported on the planet carrier and in continuous meshing engagement with the sun gear and the ring gear, and a clutch configured to selectively couple the sun gear to the input.

7. The transmission of claim 1, wherein the third gearing arrangement comprises a simple planetary gear set having a sun gear fixedly connected to the input, a ring gear, a planet carrier fixedly connected to the output, and at least one planet gear supported on the planet carrier and in continuous meshing engagement with the sun gear and the ring gear, and a clutch configured to selectively couple the ring gear to the second shaft.

8. The transmission of claim 1, further comprising a clutch configured to selectively couple the fourth shaft to the output.

9. The transmission of claim 1, further comprising a brake configured to selectively hold the third shaft against rotation.

10. The transmission of claim 1, further comprising a clutch configured to selectively couple the input to the third shaft.

11. A transmission comprising:
an input shaft;
an output shaft;
first, second, third, and fourth shafts;
a first gearing arrangement which fixedly imposes a linear speed relationship among the first shaft, the second shaft, the third shaft, and the fourth shaft;
a second gearing arrangement which selectively constrains the fourth shaft to rotate faster than the input shaft and in a same direction;
a third gearing arrangement which selectively imposes a linear speed relationship among the input shaft, the output shaft, and the second shaft;
a first brake configured to selectively hold the first shaft against rotation;
a second brake configured to selectively hold the third shaft against rotation;
a first clutch configured to selectively couple the input shaft to the third shaft; and
a second clutch configured to selectively couple the fourth shaft to the output shaft.

12. The transmission of claim 11, wherein the first gearing arrangement comprises:
a first simple planetary gear set having a first sun gear fixedly coupled to the first shaft, a first ring gear fixedly coupled to the third shaft, a first planet carrier fixedly coupled to the second shaft, and at least a first planet gear supported for rotation on the first planet carrier and in continuous meshing engagement with the first sun gear and the first ring gear; and
a second simple planetary gear set having a second sun gear fixedly coupled to the first shaft, a second ring gear fixedly coupled to the fourth shaft, a second planet carrier fixedly coupled to the third shaft, and at least a second planet gear supported for rotation on the second planet carrier and in continuous meshing engagement with the second sun gear and the second ring gear.

13. The transmission of claim 12, wherein the second gearing arrangement comprises a third simple planetary gear set having a third sun gear fixedly held against rotation, a third ring gear, a third planet carrier fixedly connected to the input shaft, and at least a third planet gear supported on the third planet carrier and in continuous meshing engagement with the third sun gear and the third ring gear, and a third clutch configured to selectively couple the third ring gear to the fourth shaft.

14. The transmission of claim 13, wherein the third gearing arrangement comprises a fourth simple planetary gear set having a fourth sun gear, a fourth ring gear fixedly connected to the second shaft, a fourth planet carrier fixedly connected to the output shaft, and at least a fourth planet gear supported on the fourth planet carrier and in continuous meshing engagement with the fourth sun gear and the fourth ring gear, and a fourth clutch configured to selectively couple the fourth sun gear to the input shaft.

15. The transmission of claim 11, wherein the first gearing arrangement comprises:
a double pinion planetary gear set having a first sun gear fixedly coupled to the first shaft a first ring gear fixedly coupled to the second shaft, a first planet carrier fixedly coupled to the third shaft, at least a first inner planet gear supported for rotation relative to the first planet carrier and in continuous meshing engagement with the first sun gear, and at least a first outer planet gear supported for rotation relative to the first planet carrier and in continuous meshing engagement with the first inner planet gear and the first ring gear; and
a simple planetary gear set having a second sun gear fixedly coupled to the first shaft, a second ring gear fixedly coupled to the fourth shaft, a second planet carrier fixedly coupled to the third shaft, and at least a first planet gear supported for rotation on the second planet carrier and in continuous meshing engagement with the second sun gear and the second ring gear.

16. The transmission of claim 15, wherein the second gearing arrangement comprises a second simple planetary gear set having a second sun gear, a second ring gear fixedly coupled to the fourth shaft, a second planet carrier fixedly connected to the input shaft, and at least one a second planet gear supported on the second planet carrier and in continuous meshing engagement with the second sun gear and the second ring gear, and a third brake configured to selectively hold the second sun gear against rotation.

17. The transmission of claim 16, wherein the third gearing arrangement comprises a third simple planetary gear set having a third sun gear, a third ring gear fixedly connected to the second shaft, a third planet carrier fixedly connected to the output shaft, and at least a third planet gear supported on the planet carrier and in continuous meshing engagement with the sun gear and the ring gear, and a third clutch configured to selectively couple the third sun gear to the input shaft.

18. The transmission of claim 17, wherein the first gearing arrangement comprises:
a first simple planetary gear set having a first sun gear fixedly coupled to the first shaft, a first ring gear fixedly coupled to the third shaft, a first planet carrier fixedly coupled to the second shaft, and at least a first planet gear supported for rotation on the first planet carrier and in continuous meshing engagement with the first sun gear and the first ring gear; and a second simple planetary gear set having a second sun gear fixedly coupled to the fourth shaft, a second ring gear fixedly coupled to the second shaft, a second planet carrier fixedly coupled to the third shaft, and at least a second planet gear supported for rotation on the second planet carrier and in continuous meshing engagement with the second sun gear and the second ring gear.

19. The transmission of claim 18, wherein the second gearing arrangement comprises a third simple planetary gear set having a third sun gear fixedly held against rotation, a third ring gear, a third planet carrier fixedly connected to the input shaft, and at least a third planet gear supported on the third planet carrier and in continuous meshing engagement with the third sun gear and the third ring gear, and a third clutch configured to selectively couple the third ring gear to the fourth shaft.

20. The transmission of claim 1, wherein the third gearing arrangement comprises a fourth simple planetary gear set having a fourth sun gear fixedly connected to the input, a fourth ring gear, a fourth planet carrier fixedly connected to the output, and at least a fourth planet gear supported on the fourth planet carrier and in continuous meshing engagement with the fourth sun gear and the fourth ring gear, and a fourth clutch configured to selectively couple the fourth ring gear to the second shaft.

21. A transmission comprising:
a first gearing arrangement which fixedly imposes a linear speed relationship in order of first, second, third, and fourth shafts;
a second gearing arrangement which selectively constrains the fourth shaft to rotate faster than an input shaft and in a same direction, wherein the second gearing arrangement comprises a simple planetary gear set having a sun gear fixedly held against rotation, a ring gear, a planet carrier fixedly connected to the input shaft, and at least one planet gear supported on the planet carrier and in continuous meshing engagement with the sun gear and the ring gear, and a clutch configured to selectively couple the ring gear to the fourth shaft; and
a third gearing arrangement which selectively imposes a linear speed relationship in order of the input shaft, an output shaft, and the second shaft.

* * * * *